United States Patent
Lee et al.

(10) Patent No.: US 9,602,248 B2
(45) Date of Patent: Mar. 21, 2017

(54) METHOD OF TRANSMITTING AND RECEIVING ARQ FEEDBACK INFORMATION

(75) Inventors: Eun Jong Lee, Anyang-si (KR); Ki Seon Ryu, Anyang-si (KR); Hee Jeong Cho, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1314 days.

(21) Appl. No.: 12/830,996

(22) Filed: Jul. 6, 2010

(65) Prior Publication Data
US 2011/0029831 A1 Feb. 3, 2011

Related U.S. Application Data (60) Provisional application No. 61/223,386, filed on Jul. 7, 2009, provisional application No. 61/223,393, filed on Jul. 7, 2009.

(30) Foreign Application Priority Data

Apr. 6, 2010 (KR) ........................ 10-2010-0031182

(51) Int. Cl.
*H04L 1/16* (2006.01)
*H04L 1/18* (2006.01)
*H04L 5/00* (2006.01)

(52) U.S. Cl.
CPC .......... *H04L 1/1614* (2013.01); *H04L 1/1685* (2013.01); *H04L 1/1809* (2013.01); *H04L 1/1861* (2013.01); *H04L 5/0055* (2013.01)

(58) Field of Classification Search
CPC ... H04L 1/1896; H04L 1/1614; H04L 1/1865; H04L 1/1861
(Continued)

(56) References Cited

U.S. PATENT DOCUMENTS 6,505,034 B1 1/2003 Wellig
7,570,656 B2 * 8/2009 Raphaeli et al. ............. 370/445
(Continued)

FOREIGN PATENT DOCUMENTS

KR 1020050044219 A 5/2005

OTHER PUBLICATIONS

Chang et al., "ARQ DG AWD Text Proposal with DG comment resolution," IEEE C802.16m-09/1098r3, May 6, 2009, pp. 1-6.
(Continued)

*Primary Examiner* — Steve Nguyen
(74) *Attorney, Agent, or Firm* — Birch, Stewart, Kolasch & Birch, LLP (57) ABSTRACT

A method for transmitting and receiving ARQ feedback information in a wireless communication system is disclosed. A method for allowing a mobile station to transmit an ARQ feedback in a broadband wireless access system includes receiving an ARQ block and an ARQ feedback polling from the base station, wherein the ARQ feedback polling requests the mobile station to transmit ARQ feedback information indicating whether the ARQ block is successfully received, receiving a first uplink resource for transmitting the ARQ feedback from the base station, and determining whether the received ARQ block is successfully received. The first uplink resource has a minimum size capable of being allocated to the ARQ feedback information.

15 Claims, 5 Drawing Sheets

(58) Field of Classification Search
USPC .................. 714/748–749; 455/450, 509
See application file for complete search history.

(56) References Cited

U.S. PATENT DOCUMENTS

| | | | | |
|---|---|---|---|---|
| 7,752,519 | B2* | 7/2010 | Yeo et al. ............... | 714/748 |
| 8,042,018 | B2* | 10/2011 | Heo et al. ............... | 714/748 |
| 8,107,426 | B2* | 1/2012 | Cho et al. ............... | 370/329 |
| 8,122,313 | B2* | 2/2012 | Wang et al. ............. | 714/750 |
| 2003/0103521 | A1 | 6/2003 | Raphaeli et al. | |
| 2005/0281212 | A1 | 12/2005 | Jeong et al. | |
| 2006/0280256 | A1* | 12/2006 | Kwon et al. ............. | 375/260 |
| 2007/0171849 | A1* | 7/2007 | Zhang et al. ............ | 370/310 |
| 2007/0277074 | A1 | 11/2007 | Yeo et al. | |
| 2008/0089250 | A1* | 4/2008 | Jung ........................ | 370/276 |
| 2008/0095040 | A1* | 4/2008 | Kwon et al. ............. | 370/210 |
| 2008/0137605 | A1* | 6/2008 | Berg ......................... | 370/330 |
| 2008/0146236 | A1 | 6/2008 | Son et al. | |
| 2008/0311942 | A1* | 12/2008 | Kim et al. ............... | 455/509 |
| 2009/0080351 | A1 | 3/2009 | Ryu et al. | |
| 2009/0150737 | A1 | 6/2009 | Wang et al. | |
| 2010/0128686 | A1* | 5/2010 | Nishio et al. ............ | 370/329 |

OTHER PUBLICATIONS

Chang et al., "ARQ mechanism for 16m AWD," IEEE C802.16m-09/0644r2, Mar. 11, 2009, pp. 1-4.

Loa et al., "Header-based ARQ Acknowledgement Scheme," IEEE C802.16m-08/1039r1, Sep. 17, 2008, pp. 1-4.

Mor et al., "ARQ selective bitmap—bitmap size is in 16bits resolution," IEEE C802.16maint-04/21r1, Aug. 25, 2004, pp. 0-1 (2 pages).

Okuda et al., "Unsolicited Bandwidth Allocation during Network Entry," IEEE C802.16m-09/1298, Jul. 6, 2009, pp. 1-2.

Tzavidas et al., "Polling for ARQ feedback in 16m," IEEE C802.16m-09/0938, Apr. 27, 2009, pp. 1-3.

\* cited by examiner

METHOD OF TRANSMITTING AND RECEIVING ARQ FEEDBACK INFORMATION

This application also claims the benefit of U.S. Provisional Application Ser. Nos. 61/223,386 and 61/223,393, both filed on Jul. 7, 2009, the contents of which are hereby incorporated by reference in their entirety.

This application claims the benefit of the Korean Patent Application No. 10-2010-0031182, filed on Apr. 6, 2010, which is hereby incorporated by reference as if fully set forth herein.

BACKGROUND OF THE INVENTION

Field of the Invention

The present invention relates to a wireless communication system, and more particularly to a method for transmitting and receiving automatic repeat request (ARQ) feedback information in a wireless communication system.

Discussion of the Related Art

First, a conventional Medium Access Control (MAC) Protocol Data Unit (PDU) format and a generic MAC header (GMH) format will hereinafter be described with reference to FIGS. 1 and 2.

Figure 1:
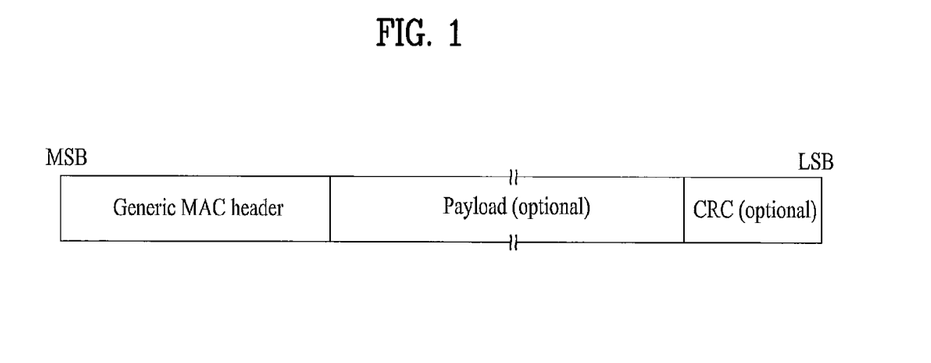
FIG. 1 is a conceptual diagram illustrating a MAC PDU format according to the related art.

FIG. 1 is a MAC PDU format according to the related art. FIG. 2 is a generic MAC header according to the related art.

Referring to FIG. 1, the MAC PDU may include a generic MAC header, a payload, and a Cyclic Redundancy Check (CRC).

The generic MAC header includes control information therein. The payload includes actual information to the exclusion of various operation and control headers. The CRC is used to check the presence or absence of an error. In more detail, the CRC is obtained when the result extracted from a polynomial expression is added to data to be transmitted, such that a transmitter transmits the resultant data as the CRC so as to perform an error check.

Figure 2:
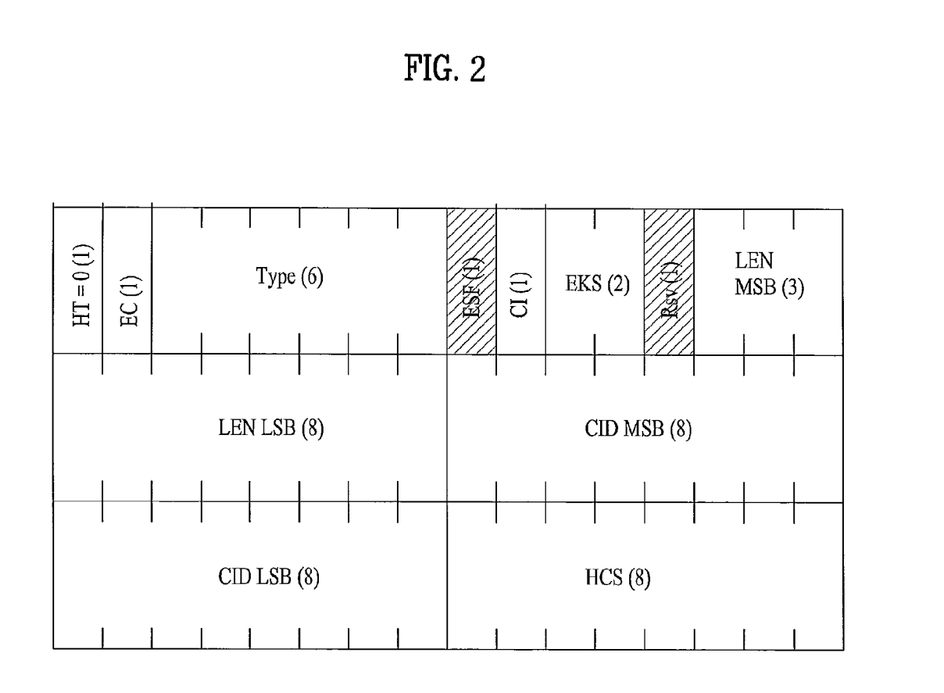
FIG. 2 is a conceptual diagram illustrating a generic MAC header format according to the related art.

Referring to FIG. 2, a Header Type (HT) field represents a header type. The generic MAC header according to the related art is classified into two header types according to the presence or absence of payload. The HT field represents a header type of a corresponding general MAC header. If the generic MAC header has a payload, the HT field is set to '0'. In contrast, if the generic MAC header does not have a payload, the HT field is set to '1'.

The generic MAC header having no payload is used to transmit signaling information. The signaling header type defined in the related art is classified into a MAC signaling header type 1 and a MAC signaling header type 2. The MAC signaling header type 1 includes a bandwidth (BW) request, a BR (Bandwidth Request) and UL Tx (Uplink Transmission) power report, a Carrier to Interference Noise Ratio (CINR) report, a physical channel report, and the like. The MAC signaling header type 2 includes a feedback header and the like.

'Type' field represents whether MAC subheaders are transmitted or not. According to the conventional art, 6 MAC subheaders are defined, the Type field is composed of 6 bits, and each of the 6 bits represents the presence or absence of each subheader.

Six MAC subheaders defined in the related art are a fragmentation subheader (FSH), a grant management subheader (GMSH), a packing subheader (PSH), an Automatic Repeat Request (ARQ) feedback, a mesh subheader, and a Fast-feedback allocation subheader (FFSH).

Next, the ARQ feedback method according to the related art will hereinafter be described in detail.

In the conventional art, if a receiver receives an ARQ-enabled PDU, it transmits an acknowledgement (ACK) message or a negative acknowledgement (NACK) message through ARQ feedback Information Elements (IEs). The receiver transmits the ACK or NACK message for all the transmitted ARQ-enabled PDUs according to an established ARQ feedback type. The ARQ feedback is transmitted as a payload format by the ARQ feedback IE, the transmission or non-transmission of the ARQ feedback payload is indicated by a fourth bit of the Type field of the generic MAC header. In the case where the ARQ feedback IE is packed with other MAC SDUs, it is located at the first one from among the packed SDUs or SDU fragments.

However, according to an Institute of Electrical and Electronics Engineers (IEEE) 802.16m system that is being standardized, a transmitter can transmit an ARQ feedback polling request to a receiver. In the case where the receiver does not receive the ARQ feedback polling request from the transmitter or does not receive an ARQ block from the transmitter during a predetermined interval, it transmits the ARQ feedback to the transmitter.

In this case, if a mobile station serves as the receiver, i.e., when the mobile station transmits ARQ feedback indicating whether or not downlink data is successfully received to a base station, a method for enabling the base station to efficiently allocate resources for ARQ feedback transmission to the mobile station is strongly needed.

SUMMARY OF THE INVENTION

Accordingly, the present invention is directed to a method for transmitting and receiving ARQ feedback information that substantially obviates one or more problems due to limitations and disadvantages of the related art.

An object of the present invention is to provide a method for efficiently allocating resources of downlink ARQ feedback transmission by a mobile station, and an apparatus for performing the same.

Another object of the present invention is to provide a method for enabling a mobile station to efficiently request additional resources from a base station on the condition that an amount of resources allocated for downlink ARQ feedback transmission is insufficient, and an apparatus for performing the same.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allowing a mobile station to transmit an automatic repeat request (ARQ) feedback in a broadband wireless access system includes receiving an ARQ block and an ARQ feedback polling from the base station, wherein the ARQ feedback polling requests the mobile station to transmit ARQ feedback information indicating whether the ARQ block is successfully received, receiving a first uplink resource for transmitting the ARQ feedback from the base station, and determining whether the received ARQ block is successfully received. In this case, the first uplink resource has a minimum size capable of being allocated to the ARQ feedback information.

The receiving of the first uplink resource may include receiving an Advanced-MAP (A-MAP) message including resource allocation information indicating the first uplink resource from the base station.

The method may further include determining whether the received ARQ block is successfully received, and if the size of the ARQ feedback information according to the determined result is not larger than that of the first uplink resource, transmitting the ARQ feedback information through the first uplink resource.

The method may further include, if the size of the ARQ feedback information according to the determined result is larger than that of the first uplink resource, transmitting a bandwidth request (BR) header, that requests a second uplink resource having a specific size suitable for transmitting the ARQ feedback information, to the base station through the first uplink resource, receiving the second uplink resource from the base station, and transmitting the ARQ feedback information to the base station through the second uplink resource.

In another aspect of the present invention, a method for allowing a base station to receive an automatic repeat request (ARQ) feedback in a broadband wireless access system includes transmitting an ARQ block and an ARQ feedback polling to the mobile station, wherein the ARQ feedback polling requests the mobile station to transmit ARQ feedback information indicating whether the ARQ block is successfully received, and allocating a first uplink resource that allows the mobile station to transmit the ARQ feedback to the mobile station, wherein the first uplink resource is a resource having a minimum size capable of being allocated to the ARQ feedback information.

The allocating of the first uplink resource may include transmitting an Advanced-MAP (A-MAP) message including resource allocation information indicating the first uplink resource to the mobile station.

The method may further include receiving the ARQ feedback information through the first uplink resource.

The method may further include receiving a bandwidth request (BR) header for requesting a second uplink resource from the mobile station through the first uplink resource, allocating the second uplink resource to the mobile station, and receiving the ARQ feedback information from the mobile station through the second uplink resource, wherein the second uplink resource has a size suitable for transmitting the ARQ feedback information.

In another aspect of the present invention, a mobile station includes a processor, and a radio frequency (RF) module that includes a plurality of antennas and transmits/receives an RF signal to and from an external part upon receiving a control signal from the processor. Upon receiving an ARQ block and an ARQ feedback polling from the base station in such a manner that the ARQ feedback polling requests the mobile station to transmit an ARQ block and ARQ feedback information indicating whether the ARQ block is successfully received, the processor receives a first uplink resource for transmitting the ARQ feedback from the base station, and determines whether the received ARQ block is successfully received. The first uplink resource may have a minimum size capable of being allocated to the ARQ feedback information.

The processor may receive the first uplink resource through an Advanced-MAP (A-MAP) message including resource allocation information indicating the first uplink resource.

The processor may determine whether the received ARQ block is successfully received. If the size of the ARQ feedback information according to the determined result is not larger than that of the first uplink resource, the processor may transmit the ARQ feedback information to the base station through the first uplink resource.

The processor may include determining whether the received ARQ block is successfully received. If the size of the ARQ feedback information according to the determined result is larger than that of the first uplink resource, the processor may transmit a bandwidth request (BR) header, that requests a second uplink resource having a specific size suitable for transmitting the ARQ feedback information, to the base station through the first uplink resource. If the second uplink resource is allocated from the base station, the processor may transmit the ARQ feedback information to the base station through the second uplink resource.

The ARQ feedback information may be configured as an ARQ feedback information element (IE). The ARQ feedback information having the minimum size may be a cumulative ACK type.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In exemplary embodiments of the present invention, a description is made of a data transmission and reception relationship between a base station (BS) and a Mobile Station (MS). Herein, the term 'BS' refers to a terminal node of a network, which communicates directly with the mobile station (MS). In some cases, a specific operation described as performed by the base station (BS) may be performed by an upper node of the base station (BS).

Namely, it is apparent that, in a network comprised of a plurality of network nodes including a base station (BS), various operations performed for communication with a mobile station (MS) may be performed by the base station (BS), or network nodes other than the base station (BS). The term 'BS' may be replaced with the term 'fixed station', 'Node B', 'eNode B (eNB)', 'access point', 'Advanced Base Station (ABS), etc. The term 'MS' may be replaced with the term 'User Equipment (UE)', 'Mobile Subscriber Station (MSS)', 'mobile terminal', 'Advanced Mobile Station (AMS)' or 'Subscriber Station (SS)', etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, P802.16Rev2, and IEEE P802.16m documents which are the standards of IEEE 802.16 system.

Specific terms used for the exemplary embodiments of the present invention are provided to help the understanding of the present invention. These specific terms may be replaced with other terms within the scope and spirit of the present invention.

Hereinafter, Automatic Repeat Request (ARQ) feedback for use in an IEEE 802.16m system according to embodiments of the present invention will be described in detail.

A transmitter transmits an ARQ feedback poll to a receiver, and requests the receiver to inform the transmitter of specific information indicating whether data (i.e., ARQ block) is successfully received in the receiver. The ARQ feedback poll may be configured in the form of an ARQ feedback poll Information Element (IE), and may be contained in a fragmentation and packing extended header (FPEH) or a multiplexing extended header (MEH). In addition, the transmitter may request the ARQ feedback poll from the receiver using other methods to the exclusion of the Information Element (IE) format as necessary. For example, the transmitter may transmit only a flow ID (FID) for identifying a flow requesting an ARQ feedback as an extended header to the receiver, such that it can transmit an ARQ feedback poll for transmission, where ARQ is applied to the corresponding FID, to the receiver. For example, the extended header may be an ARQ feedback polling extended header (APEH) newly defined for the ARQ feedback poll.

A format wherein the ARQ feedback poll is contained in the FPEH will hereinafter be described with reference to FIG. 1.

Table 1 shows some parts of fields contained in the FPEH.

TABLE 1

| Syntax | Size (bit) | Notes |
|---|---|---|
| FPEH( ) { | | |
| Type | 4 | FPEH Type |
| FC | 2 | Fragmentation Control bits (see Table 665) |
| If (MAC Header==AGMH) { | | |
| SN | 10 | SN is maintained per connection. For non ARQ connection, 'SN' represents the MAC PDU Payload Sequence Number and the 'SN' value increments by one (modulo 1024) for each MAC PDU. For ARQ connection, 'SN' represents the ARQ block sequence number. |

TABLE 1-continued

| Syntax | Size (bit) | Notes |
|---|---|---|
| AFP | 1 | ARQ feedback poll indicator<br>0 = No ARQ feedback poll<br>1 = ARQ feedback poll for the connection indicated in AGMH or MEH if multiplexing is used |

Referring to FIG. 1, an ARQ feedback poll indicator (AFP) field is contained in the FPEH. If the AFP field is set to '1', this means that the ARQ feedback poll for corresponding connection is established.

Next, an ARQ feedback polling extended header (APEH) format will hereinafter be described in detail.

Table 2 shows an example of the ARQ feedback polling extended header structure.

TABLE 2

| Syntax | Size (bits) | Notes |
|---|---|---|
| APEH ( ){ | | |
| Type | 4 | Extended header type = 0b1001 (APEH Type) |
| FID | 4 | Reference FID for ARQ feedback polling |

Referring to Table 2, an APEH includes a Type field indicating that this extended header is an APEH for ARQ feedback polling and a flow ID (FID) field for identifying a flow that requests ARQ feedback. If the receiver receives this header from the transmitter, it transmits ARQ feedback information for transmission to which an ARQ of a flow indicated by the FID field is applied, to the transmitter.

In the case where the receiver receives an ARQ feedback poll from the transmitter through any one of the above-mentioned methods, the receiver may feed back the reception result of an ARQ block to the transmitter through an ARQ feedback IE. The ARQ feedback IE may be configured in a packed payload or piggybacked format, such that it is contained in a payload of a PDU. The ARQ feedback IE may be transmitted to the transmitter through either a standalone MAC PDU or an ARQ feedback extended header (AFEH), and the ARQ feedback IE format is shown in the following Table 3.

Table 3 shows some parts of fields contained in the ARQ feedback information element (IE).

TABLE 3

| Syntax | Size (bits) | Notes |
|---|---|---|
| ARQ_feedback_IE(LAST){ | variable | |
| Last | 1 | 0 = More ARQ Feedback IE in the list<br>1 = Last ARQ Feedback IE in the list |
| FID | 4 | The ID of the flow being referenced |
| FLAG | 1 | 0 = Cumulative ACK<br>1 = Selective ACK MAP existence |
| SN | 10 | FLAG = 0, ARQ block up to and including SN has been received successfully.<br>FLAG = 1, ARQ block less than SN has been received successfully. |
| if(FLAG==1){ | | |
| Selective ACK MAP | 5 | Each bit represents ACK or NACK or NACK Suspended of corresponding ARQ block. '0' is NACK if NSI equals zero, '0' is NACK suspended if NSI equals one, and '1' is ACK. First MSB of first Selective ACK MAP1 represents ACK or NAK information of SN. Contiguous bits after first MSB of first ACK MAP are corresponding to contiguous SN. |
| FLAG | 1 | 0 = No more selective ACK MAP and FLAG<br>1 = Another set of selective ACK MAP and FLAG follows |
| while(FLAG==1){ | | |
| Selective ACK MAP | 7 | Each bit represents ACK or NACK or NACK Suspended of corresponding ARQ block. '0' is NACK if NSI equals zero, '0' is NACK suspended if NSI equals one, and '1' is ACK. Selective ACK MAP represents ACK or NAK information of ARQ blocks after first selective ACK MAP. |
| FLAG | 1 | 0 = No more selective ACK MAP and FLAG<br>1 = Another set of selective ACK MAP and FLAG follows |
| } | | |
| } | | |
| Padding | variable | For Byte alignment |
| } | | |

Referring to Table 3, the ARQ feedback information element (IE) may include a Last field, a Flow ID field, a FLAG field, etc. The Last Field indicates whether other ARQ feedback IEs other than the corresponding ARQ feedback IE are continued. The FLAG field indicates an ACK format. Assuming that the flag field is set to '1', the ACK format is selectively acknowledged, and the selective ACK MAP field may indicate the success or failure of each ARQ block. Table 1 shows some fields of the ARQ feedback IE, and the ARQ feedback IE may be a variable-sized IE including many more or fewer fields.

If the mobile station serves as the transmitter, the mobile station may transmit ARQ feedback poll to the base station by piggybacking an FPEH (Fragmentation and Packing Extended Header) or MEH (Multiplexing Extended Header) including the ARQ feedback poll to a conventional uplink data packet, and transmits the piggybacked result.

On the other hand, if the mobile station serves as the receiver (i.e., downlink data transmission), the base station may perform unsolicited bandwidth assignment on a bandwidth via which ARQ feedback can be transmitted to the mobile station through either an extended header contained in the MAC PDU for downlink data transmission or a MAC management message. Therefore, ARQ feedback for downlink data may be transmitted via uplink by the mobile station.

Generally, ARQ feedback information may be piggybacked with other data transmitted via uplink, and be transmitted. However, in the case where the corresponding mobile station does not have uplink data to be transmitted to the base station, unexpected problems may be generated. In this case, the base station requests ARQ feedback from the mobile station (i.e., ARQ feedback poll), and resources (bandwidth) for enabling the mobile station to transmit an uplink ARQ feedback to the base station may be pre-assigned through an extended header or a MAC message.

However, assuming that uplink transmission data has a fixed size, the above-mentioned resource assignment generates no problems in pre-allocating resources. However, as described above, the ARQ feedback IE may have a variable size, such that the base station may have difficulty in allocating accurate-sized resources (bandwidth) for the variable-sized ARQ feedback IE.

Resource Allocation Method for Effective ARQ Feedback

Therefore, one embodiment of the present invention provides a more efficient method for enabling the base station to perform unsolicited bandwidth assignment for ARQ feedback in relation to the mobile station.

Specifically, the present invention provides a method for enabling the base station to effectively assign ARQ feedback bandwidth to the mobile station under the condition that the mobile station having no uplink data to be transmitted to the base station transmits a feedback (ARQ feedback) for a received downlink ARQ block to the base station.

In the case where the base station requests an ARQ feedback from the mobile station that has no uplink data to be transmitted through an ARQ feedback polling message, the base station provides the mobile station with the polling message and a request for allocating only a minimum amount of resources (e.g., 6 or 8 bytes) through which the mobile station can transmit the ARQ feedback.

At this time, in the case where a NACK message occurs in the ARQ block received in the mobile station, the ARQ feedback may be transmitted from the mobile station. Otherwise, by the polling of the base station, the ARQ feedback may be transmitted from the mobile station. If the ARQ feedback poll request is indicated by the transmitter, there is high probability that most ARQ feedbacks are responses to the ACK message, and this means that the probability of generating only a cumulative ACK is high. Here, the cumulative ACK is a feedback type, that means information indicating the presence or absence of an error in overall reception data that has been received after a specific time point (e.g., the last feedback transmission) is cumulated such that it can indicate the presence or absence of the error using only one ACK/NACK. Therefore, minimum resources for transmitting the ARQ feedback IE may mean resources capable of accommodating cumulative ACK information therein. However, the scope or spirit of the present invention is not limited only to the cumulative ARQ, and the selective ACK can also be applied to the present invention without any difficulty.

Resources for ARQ feedback may be contained in the extended header or the MAC management message, or may also be allocated to the mobile station through an A-MAP.

Detailed resource allocation methods according to the embodiment of the present invention will hereinafter be described in detail.

Minimum Resource Allocation for ARQ Feedback

The base station transmits the ARQ feedback polling message, and at the same time unsolicitedly allocates resources (e.g., 7 or 8 bytes) capable of transmitting minimum ARQ feedback information to the corresponding mobile station.

In order to allow the mobile station to transmit the ARQ feedback to the base station, it is necessary not only for resources corresponding to the ARQ feedback IE but also for additional resources (e.g., header, CRC, etc.) for constructing the MAC PDU to be allocated.

By the above-mentioned Table 2, if Flow ID field of 4 bits, Last field of 1 bit, FLAG field of 1 bit, and SN field of 10 bits are added, a minimum size (at this time, the ACK format is a cumulative type) of the ARQ feedback IE is denoted by a resource of 2 bytes. If the ARQ feedback IE further includes the selective ACK MAP, a minimum size of the ARQ feedback IE is a resource of 3 bytes.

In addition, in order to configure the MAC PDU, resources for a header (i.e., Advanced Generic MAC Header (AGMH)) are required, and types of the resources are shown in the following table 4.

TABLE 4

| Syntax | Size (bit) | Notes |
|---|---|---|
| Advanced Generic MAC Header( ) { | | |
| Flow ID | 4 | Flow Identifier |
| EH | 1 | Extended header presence indicator; When set to '1', this field indicates that an Extended Header is present following this AGMH. |
| Length | 11 | This field indicates the length in bytes of MAC PDU including the AGMH and extended header if present. If |

TABLE 4-continued

| Syntax | Size (bit) | Notes |
|---|---|---|
| | | MLEH is present in a MPDU, Length field indicates 11 LSB of length in byte of MAC PDU. |
| } | | |

Referring to Table 4, an advanced generic MAC header (AGMH) for satisfying the IEEE 802.16m standard includes a Flow ID field for identifying the flow of a corresponding MAC PDU, an EH field for indicating the presence or absence of an extended header, and a length field for indicating the length of a corresponding MAC PDU. The AGMH has a size of 2 bytes.

In addition, 1 byte for indicating a MAC management type and 2 bytes for CRC may also be added to the AGMH.

If resources for including the above-mentioned information are added, minimum resources for ARQ feedback transmission become 6 bytes or 8 bytes.

If ARQ feedback information is transmitted through minimum resources allocated by the base station, the mobile station transmits an ARQ feedback message (if the ARQ feedback message is transmitted standalone, this standalone feedback message is configured as a MAC management message) to the base station using resources allocated along with the polling message.

If an amount of ARQ feedback information to be transmitted is insufficient to be used as allocated resources, the mobile station can transmit a bandwidth request (BR) message (i.e., a BR header) for ARQ feedback to the base station using the resources allocated along with the polling message.

A detailed description of the above-mentioned method will hereinafter be described with reference to FIGS. 3 to 5.

Figure 3:
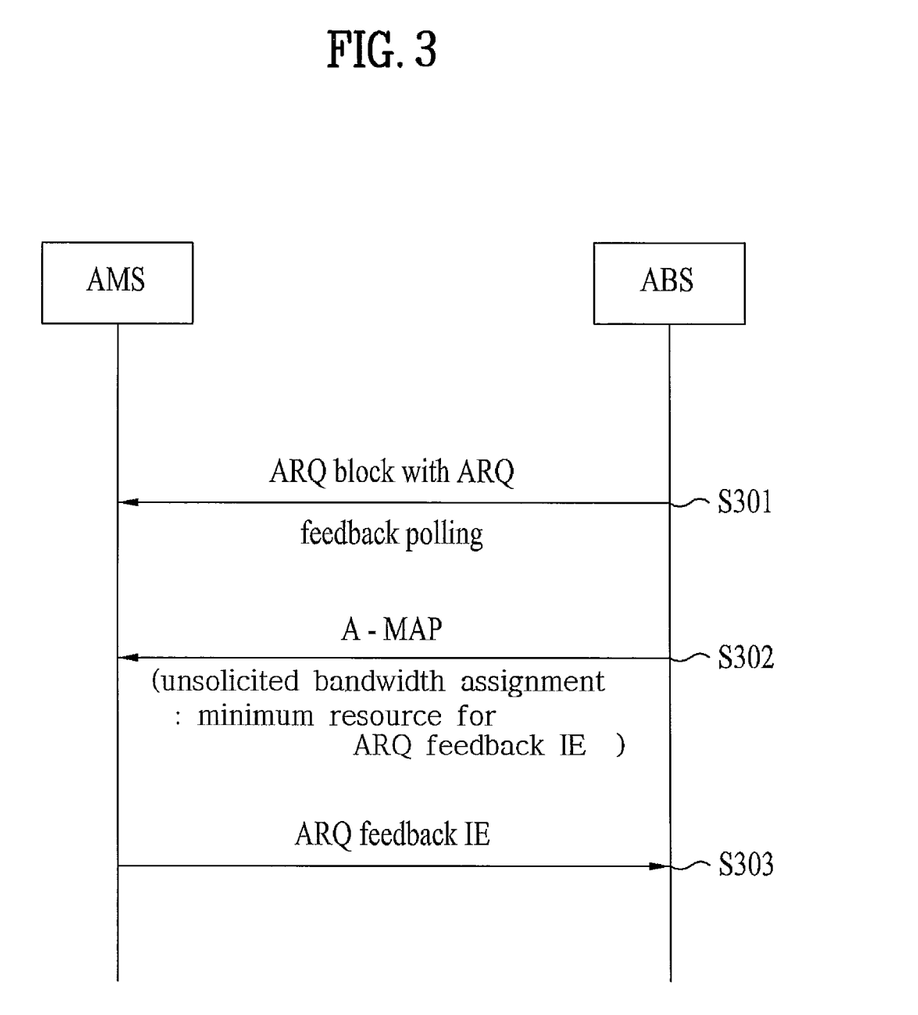
FIG. 3 is a flowchart illustrating one example of minimum resource allocation for ARQ feedback according to one embodiment of the present invention.

FIG. 3 is a flowchart illustrating one example of minimum resource allocation for ARQ feedback according to one embodiment of the present invention.

Referring to FIG. 3, the base station performs ARQ feedback polling while simultaneously transmitting downlink data (i.e., ARQ block), such that it requests the mobile station to transmit an ARQ feedback for indicating the success or failure of reception at step S301. In this case, although FIG. 3 shows that the ARQ block and an FPEH (Fragmentation and Packing Extended Header) for the ARQ feedback polling are simultaneously transmitted (i.e., through the same MAC PDU), the ARQ block and the FPEH may also be respectively transmitted through different MAC PDUs as necessary. If the ARQ block and the FPEH are transmitted through different MAC PDUs, it is necessary for the base station to specify the ARQ block requesting the ARQ feedback through the polling. In this case, the ARQ block may be indicated through the Flow ID field, and this ARQ block indication through the Flow ID field can be equally applied to the following embodiments.

In this case, the base station can start 'ARQ_Polling_Timeout' indicating a specific time in which ARQ feedback is expected. During the ARQ_Polling_Timeout time, the base station may re-perform the ARQ feedback polling. This ARQ feedback polling may be carried out either when an ARQ buffer is fully filled with data or when the last ARQ block not sent is transmitted.

In addition, the base station may transmit minimum resource allocation information for ARQ feedback through the A-MAP at step S302.

Therefore, the mobile station determines whether an ARQ block transmitted from the base station is successfully received or not. The mobile station configures the determined result in the form of an ARQ feedback IE, such that it can transmit the ARQ feedback to the base station through uplink resources indicated by resource allocation information of the A-MAP at step S303.

In this case, the base station having received the ARQ feedback from the mobile station may allow at least one ARQ window to be slid owing to the ARQ feedback, such that data (ARQ block) can be additionally transmitted. If the base station further requires the ARQ feedback information, the base station may re-perform unsolicited bandwidth (BW) allocation of ARQ feedback resources through the polling at the additionally transmitted ARQ block as necessary.

Figure 4:
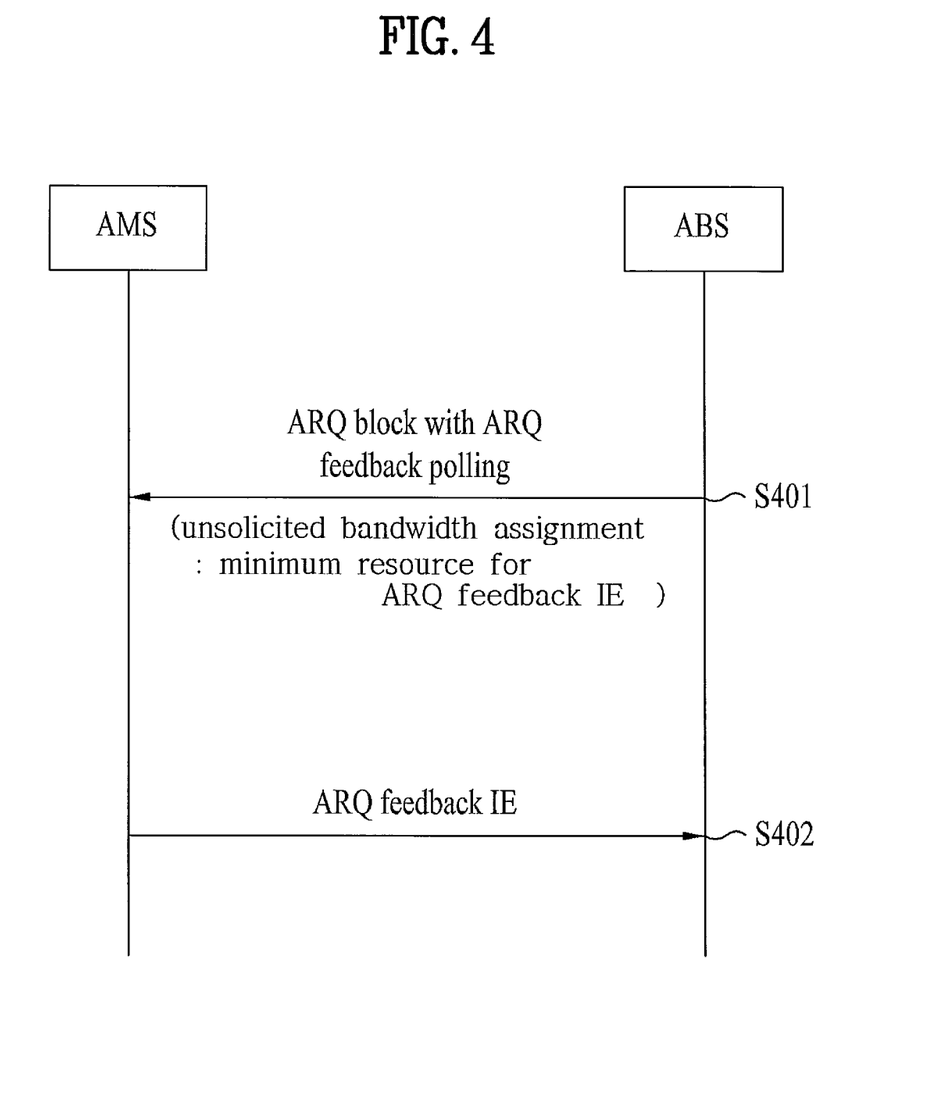
FIG. 4 is a flowchart illustrating another example of minimum resource allocation for ARQ feedback according to one embodiment of the present invention.

FIG. 4 is a flowchart illustrating another example of minimum resource allocation for ARQ feedback according to one embodiment of the present invention.

Differently from FIG. 3, the method shown in FIG. 4 simultaneously executes two steps S301 and S302 of FIG. 3. That is, the base station transmits the ARQ block, and at the same time can transmit the ARQ feedback polling message and resources for ARQ feedback at step S401.

A subsequent operation (S402) of the mobile station is similar to operation S303 of FIG. 3.

Referring to FIGS. 3 and 4, the above-mentioned ARQ feedback resource allocation and ARQ feedback transmission illustrate that minimum resources allocated by the base station are sufficient for the corresponding ARQ feedback transmission. Hereinafter, the exemplary case where resources allocated from the base station are not sufficient for ARQ feedback transmission will hereinafter be described with reference to FIG. 5.

Figure 5:
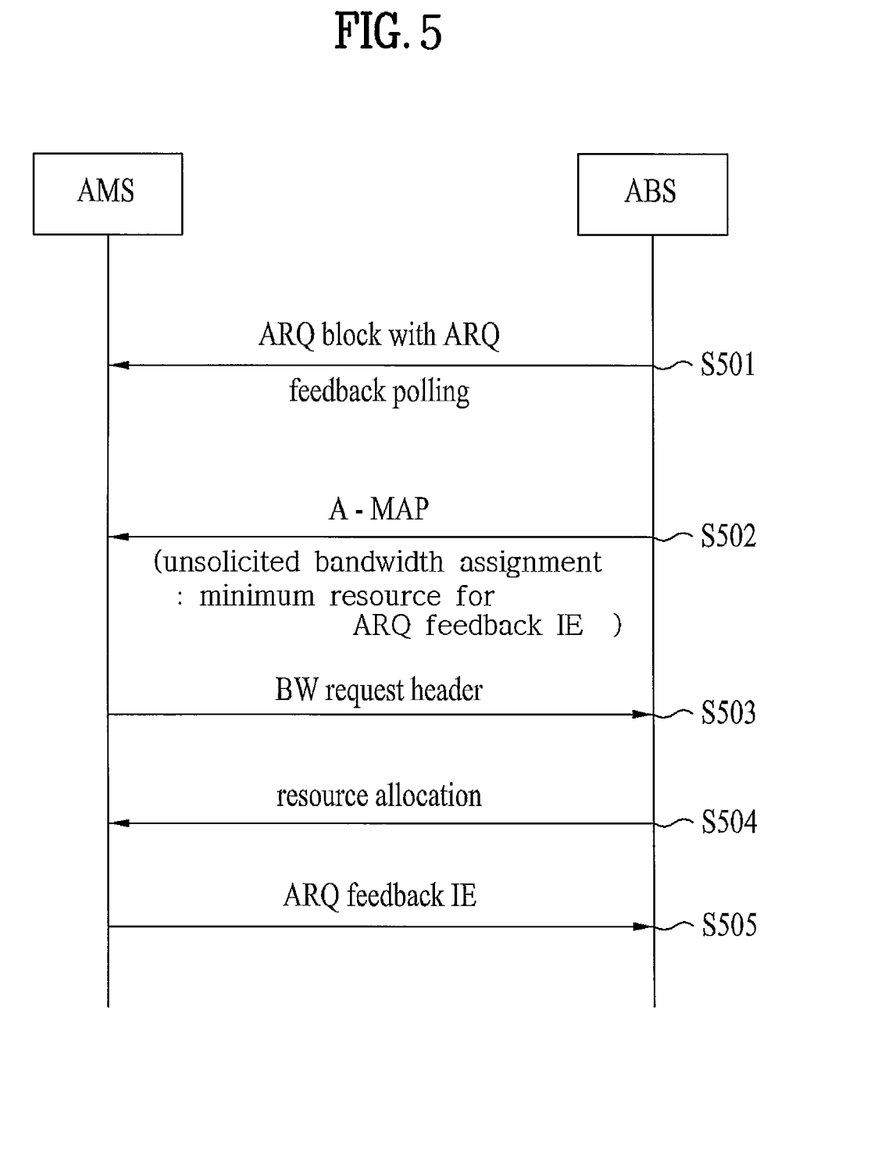
FIG. 5 is a flowchart illustrating one example of an ARQ feedback method on the condition that an amount of minimum resources allocated for ARQ feedback is insufficient according to one embodiment of the present invention.

FIG. 5 is a flowchart illustrating one example of an ARQ feedback method on the condition that an amount of minimum resources allocated for ARQ feedback is insufficient according to one embodiment of the present invention.

FIG. 5 assumes that ARQ feedback resources are transmitted using the same method as in FIG. 3. Therefore, since steps S501 to S502 of FIG. 5 are similar to steps of S301 to S302 of FIG. 3, a detailed description thereof will herein be omitted for convenience of description.

The mobile station may determine whether the ARQ block transmitted from the base station is successfully received or not, configure the determined result as an ARQ feedback IE, and desire to transmit the ARQ feedback to the base station through uplink resources indicated by resource allocation information of the A-MAP. However, in some cases, an amount of resources allocated for the above-mentioned operations may be insufficient to achieve the ARQ feedback transmission.

In this case, by means of resources allocated from the base station to achieve the ARQ feedback, the mobile station may transmit a bandwidth request (BR) header (i.e., BW request header) to the base station such that it can request resources needed for ARQ feedback transmission from the base station at step S503.

The base station having received the BR header from the mobile station allocates resources requested by the mobile station to the mobile station at step S504.

The mobile station can transmit the ARQ feedback to the base station using the requested UL resources at step S505.

Meanwhile, differently from FIG. 5, if the amount of minimum allocation resources required for the ARQ feedback is insufficient, the mobile station may independently transmit ARQ feedback information using resources allocated along with the polling, and at the same time transmit an indicator for representing that much more ARQ feedback resources are needed. In the case of using the above-mentioned method, an indicator for requesting additional resource allocation may be defined in the ARQ feedback IE. This indicator may represent an uplink (UL) grant for BW request that requests a bandwidth of ARQ feedback information that is not yet transmitted from the mobile station, or may also represent that resources capable of transmitting minimum ARQ feedback information are additionally requested.

In accordance with another aspect of the present invention, when the base station performs the ARQ feedback polling and at the same time allocates uplink resources to the mobile station, it may allocate only minimum resources (e.g., 6 bytes) for BW request instead of minimum resources for ARQ feedback as necessary. Therefore, through resources allocated along with the ARQ feedback polling from the base station, the mobile station requests resources required for transmitting the ARQ feedback to the base station from the base station, i.e., the mobile station transmits a BR header to the base station, such that the base station can allocate the requested resources to the mobile station. The mobile station can transmit the ARQ feedback through the allocated resources. In conclusion, through a process similar to a '3-step BW request' procedure, the mobile station can transmit the ARQ feedback IE to the base station.

In accordance with another aspect of the present invention, the base station can allocate not only the ARQ feedback polling and minimum resources required for ARQ feedback transmission, but also resources for BW request to the mobile station. The mobile station having received resources may transmit the ARQ feedback information, and at the same time may request additional bandwidth from the base station through corresponding resources on the condition that the amount of received resources is insufficient. Assuming that all ARQ feedback IEs can be transmitted through the allocated resources, all of the corresponding resources may be used for the ARQ feedback IE without using the BW request. At this time, the base station may also allocate resources for the ARQ feedback IE including only the cumulative ACK as ARQ feedback resources as necessary. In the case where the ARQ feedback IE including only the cumulative ACK is transmitted as a standalone MAC PDU, the size of necessary resources is a total of 7 bytes [AGMH (2 bytes)+Management message type (1 byte)+ARQ feedback IE (2 bytes)+PHY CRC (2 bytes)]. However, since the bandwidth (BW) allocation in the IEEE 802.16m system is defined to be allocated in units of 6 or 8 bytes, a resource of 1 byte may be allocated for other purposes (for example, an operation for requesting additional resources from the base station). An ARQ feedback IE format for the above-mentioned allocation can be defined as shown in the following Table 5, and may also be used only when the ARQ feedback IE format is transmitted as a standalone MAC PDU to reduce overhead.

TABLE 5

| Syntax | Size | Notes |
|---|---|---|
| ARQ feedback IE (LAST) { | Variable | |
|   Flow ID | 4 | The ID of the flow being referenced |
|   LAST | 1 | 0 = More ARQ feedback IE in the list<br>1 = LAST ARQ feedback in the list |
|   FLAG | 1 | 0 = cumulative ACK, 1 = Selective ACK MAP existence |
|   SN | 10 | FLAG=0, ARQ block up to and including SN has been received successfully<br>FLAG=1, ARQ block less than SN has been received successfully |
|   If (FLAG == 1){ | | |
|     Selective ACK MAP | 7 | Each bit represents ACK or NACK of corresponding ARQ block |
|     FLAG | 1 | 0 = No more selective ACK MAP<br>1 = Another set of selective ACK MAP and FLAG follows |
|   }else{ | | |
|     BW FLAG | 1 | 0 = None of additional bandwidth request for ARQ feedback<br>1 = Necessity of additional bandwidth request for transmitting selective ACK MAP |
|     if (BW FLAG ==1) { | | |
|       BW size | 7 | Bandwidth for additionally transmitting ARQ feedback for the remaining ARQ blocks can be requested along with the cumulative ACK |
|     }else{ | | |
|       reserved | 7 | |
|     } | | |
| } | | |

Referring to Table 5, 'BW FLAG' field is contained in a MAC PDU including the ARQ feedback IE, such that it can indicate whether additional bandwidth is requested or not. If 'BW FLAG' field is set to '1', the size of requested resources can be indicated by the BW size field.

Mobile Station (MS) and Base Station (BS) Structure

Now a description will be given of an MS and a BS (femto BS (FBS) and macro BS (MBS)) for implementing the above-described exemplary embodiments of the present invention, according to another exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 6.

Figure 6:
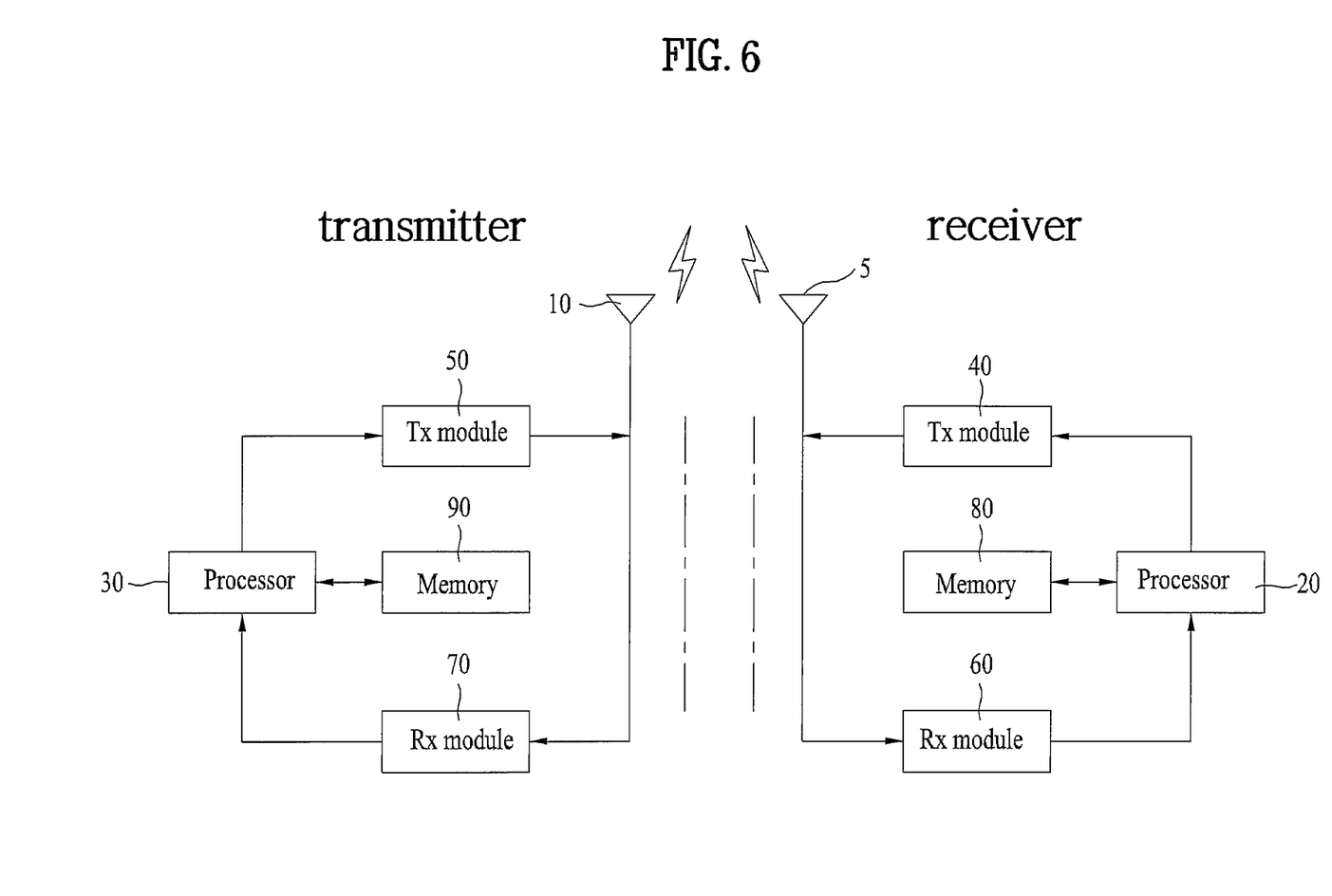
FIG. 6 is a block diagram illustrating a transmitter and a receiver according to another embodiment of the present invention.

FIG. 6 is a block diagram of a transmitter and a receiver according to an exemplary embodiment of the present invention.

Referring to FIG. 6, the structures of the transmitter and the receiver are illustrated on the left and right sides of FIG. 6, respectively. Each of the receiver and the transmitter may include an antenna 5 or 10, a processor 20 or 30, a Transmission (Tx) module 40 or 50, a Reception (Rx) module 60 or 70, and a memory 80 or 90. Each component of the transmitter operates in correspondence with its counterpart of the receiver.

The antennas 5 and 10 transmit Radio Frequency (RF) signals generated from the Tx modules 40 and 50 in the air interface, or receive RF signals in the air interface and output the received RF signals to the Rx modules 60 and 70. When Multiple Input Multiple Output (MIMO) is supported, two or more antennas may be used.

An antenna, a Tx module and an Rx module may collectively form an RF module.

The processors 20 and 30 provide overall control to the MS. For example, the processors 20 and 30 may perform a control function, a MAC frame conversion control function based on service characteristics and propagation environments, a handover function, authentication, and encryption in order to perform the afore-described exemplary embodiments. In more detail, the processors 20 and 30 may provide overall control for the above-mentioned multiple BS transmission mode procedure.

Specifically, upon receiving an ARQ feedback polling request along with the ARQ block from the serving BS, the processor of the mobile station (MS) receives resources for ARQ feedback transmission through the A-MAP from the base station, determines whether the amount of allocated resources is sufficient for ARQ feedback transmission, and determines whether the received ARQ block is successfully received. If the amount of allocated resources is sufficient, the processor of the mobile station (MS) may configure the ARQ feedback, that depends on the reception success or failure decided through corresponding resources, in the form of an ARQ feedback IE, and transmit the resultant ARQ feedback to the base station. In contrast, if the amount of allocated resources is not sufficient, the processor of the mobile station may request UL resources requested for ARQ feedback transmission through the BW header. In this case, the BW header can be transmitted through resources allocated from the base station so as to achieve initial ARQ feedback.

The processors 20 and 30 may provide overall control to the operations shown in the embodiments of FIGS. 3 to 5.

The Tx modules 40 and 50 may transmit data scheduled by the processors 20 and 30 to the antennas 5 and 10, after a predetermined coding and modulation.

The Rx modules 60 and 70 may recover original data by decoding and demodulating RF signals received through the antennas 5 and 10 over the air interface and output the original data to the processors 20 and 30.

The memories 80 and 90 may store programs for processing and control of the processors 20 and 30 and temporarily store input/output (I/O) data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the base station (BS) may perform, in at least one of the above-described modules or in a separately procured means, module or part, a control function according to the embodiments of the present invention, an Orthogonal Frequency Division Multiple Access (OFDMA) packet scheduling, Time Division Duplex (TDD) packet scheduling, channel multiplexing, a variable MAC frame control function based on service characteristics and a propagation environment, a real-time high-speed traffic control function, a handover function, an authentication and encryption function, a packet modulation and demodulation function for data transmission, a high-speed packet channel coding function, a real-time modem control function, and the like.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

As apparent from the above description, exemplary embodiments of the present invention have the following effects.

First, according to the embodiments of the present invention, the base station allocates a minimum amount of resources for ARQ feedback to the mobile station, such that unnecessary resource consumption can be minimized.

Second, according to the embodiments of the present invention, in the case where an amount of resources allocated for ARQ feedback is insufficient, the mobile station performs a bandwidth request (BR) action using corresponding resources, such that it can efficiently request additional resources from the base station.

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for allowing a mobile station to transmit an automatic repeat request (ARQ) feedback in a broadband wireless access system, the method comprising:
   receiving, by the mobile station, at least one ARQ block from a base station;
   receiving, by the mobile station, an ARQ feedback poll from the base station, wherein the ARQ feedback poll requests the mobile station to transmit ARQ feedback information indicating a reception status of the at least one ARQ block; and
   transmitting, by the mobile station, the ARQ feedback information to the base station,
   wherein the ARQ feedback information selectively comprises one of a first type of ARQ feedback information which cumulatively indicates the reception status and a second type of ARQ feedback information which selectively indicates the reception status,
   wherein the mobile station is assigned unsolicited bandwidth associated with a first uplink resource for transmitting the ARQ feedback information of the first type, wherein, when a size of the ARQ feedback information of the first type is smaller than that of the first uplink resource, the ARQ feedback information of the first type is transmitted by the mobile station to the base station through the first uplink resource, and wherein, when the size of the ARQ feedback information of the first type is larger than that of the first uplink resource, a bandwidth request (BR) header is transmitted by the mobile station to the base station through the first uplink resource, the BR header requesting a second uplink resource having a specific size suitable for transmitting the ARQ feedback information.

2. The method according to claim 1, wherein the ARQ feedback information is configured as an ARQ feedback information element (IE).

3. The method according to claim 2, wherein information regarding the unsolicited bandwidth is received through a MAP message from the base station.

4. The method according to claim 2, wherein the ARQ feedback information of the first type is cumulative ACK information.

5. The method according to claim 1, further comprising:
receiving bandwidth assignment information indicating the second uplink resource from the base station; and
transmitting the ARQ feedback information to the base station through the second uplink resource.

6. A method for allowing a base station to receive an automatic repeat request (ARQ) feedback in a broadband wireless access system, the method comprising:
transmitting, by the base station, at least one ARQ block to a mobile station;
transmitting, by the base station to the mobile station, an ARQ feedback poll that requests transmission of ARQ feedback information indicating a reception status of the at least one ARQ block, the ARQ feedback information selectively comprising one of a first type of ARQ feedback information which cumulatively indicates the reception status and a second type of ARQ feedback information which selectively indicates the reception status; and
transmitting, by the base station to the mobile station, information regarding unsolicited bandwidth associated with a first uplink resource for transmitting the ARQ feedback information of the first type,
wherein, when a size of the ARQ feedback information of the first type is smaller than that of the first uplink resource, the ARQ feedback information of the first type is received by the base station from the mobile station through the first uplink resource, and
wherein, when the size of the ARQ feedback information of the first type is larger than that of the first uplink resource, a bandwidth request (BR) header requesting a second uplink resource allocation is received by the base station from the mobile station through the first uplink resource.

7. The method according to claim 6, wherein the ARQ feedback information is configured as an ARQ feedback information element (IE).

8. The method according to claim 7, wherein the information regarding the unsolicited bandwidth is transmitted through a MAP message to the mobile station.

9. The method according to claim 7, wherein the ARQ feedback information of the first type is cumulative ACK information.

10. The method according to claim 6, further comprising:
allocating the second uplink resource to the mobile station; and
receiving the ARQ feedback information from the mobile station through the second uplink resource,
wherein the second uplink resource has a size suitable for transmitting the ARQ feedback information of the first type.

11. A mobile station, comprising:
a radio frequency (RF) module configured to transmit and receive a radio signal; and
a processor configured to:
control the RF module to receive at least one automatic repeat request (ARQ) block and an ARQ feedback poll from a base station,
wherein the ARQ feedback poll requests the mobile station to transmit ARQ feedback information indicating a reception status of the at least one ARQ block, and
control the RF module to transmit ARQ feedback information to the base station,
wherein the ARQ feedback information selectively comprises one of a first type of ARQ feedback information which cumulatively indicates the reception status and a second type of ARQ feedback information which selectively indicates the reception status,
wherein the mobile station is assigned unsolicited bandwidth associated with a first uplink resource for transmitting the ARQ feedback information of the first type,
wherein, when a size of the ARQ feedback information of the first type is smaller than that of the first uplink resource, the ARQ feedback information of the first type is transmitted by the RF module to the base station through the first uplink resource, and
wherein, when the size of the ARQ feedback information of the first type is larger than that of the first uplink resource, a bandwidth request (BR) header requesting a second uplink resource allocation is transmitted by the RF module to the base station through the first uplink resource.

12. The mobile station according to claim 11, wherein the ARQ feedback information is transmitted in an ARQ feedback information element (IE) format.

13. The mobile station according to claim 12, wherein the processor further controls the RF module to receive information regarding the unsolicited bandwidth through a MAP message from the base station.

14. The mobile station according to claim 12, wherein the ARQ feedback information of the first type is cumulative ACK information.

15. The mobile station according to claim 12,
wherein, if bandwidth assignment information indicating the second uplink resource is received by the RF module from the base station, the processor controls the RF module to transmit ARQ feedback information to the base station through the second uplink resource.

* * * * *